United States Patent [19]

Burcaw, Jr. et al.

[11] 4,286,971
[45] Sep. 1, 1981

[54] REMOVAL OF NAPHTHALENE FROM RECIRCULATED WASH OIL

[75] Inventors: Kenneth R. Burcaw, Jr., Easton; Robert E. Watkins, Jr., Bethlehem, both of Pa.

[73] Assignee: Bethlehem Steel Corporation, Bethlehem, Pa.

[21] Appl. No.: 82,372

[22] Filed: Oct. 5, 1979

[51] Int. Cl.³ .............................................. B01D 19/00
[52] U.S. Cl. ................................... 55/48; 55/49; 55/53; 55/85; 55/89; 201/29; 585/833; 585/867; 233/29
[58] Field of Search .................. 55/84, 137, 85, 45, 55/46, 48, 49, 70, 89, 53; 201/29; 585/833, 867; 233/29

[56] References Cited

U.S. PATENT DOCUMENTS

| | | |
|---|---|---|
| 1,778,831 | 10/1930 | Jones . |
| 1,926,188 | 9/1933 | Ambler . |
| 2,418,988 | 4/1947 | Segur . |
| 2,649,403 | 8/1953 | Eaton .............................. 201/30 |
| 2,649,404 | 8/1953 | Reynolds ......................... 201/30 |
| 2,747,680 | 5/1956 | Kilpatrick ......................... 55/85 |
| 2,961,065 | 11/1960 | Helm et al. ..................... 55/48 |
| 3,448,919 | 6/1969 | Hemfort . |
| 3,835,035 | 10/1974 | Fainman et al. . |
| 3,990,632 | 11/1976 | Hemfort . |
| 4,026,462 | 5/1977 | Tenthoff et al. . |
| 4,154,584 | 5/1979 | Ullrich ............................. 201/29 |

Primary Examiner—Bernard Nozick
Attorney, Agent, or Firm—Joseph J. O'Keefe; Charles A. Wilkinson

[57] ABSTRACT

A bleed stream from the recirculating wash oil in a final cooling system for coke oven gas is centrifugally separated into a waste water stream, a sludge stream and a clean, dry oil stream which is substantially free of solids and has a water content less than 0.5% (wt.). The clean, dry oil stream is heated to less than about 160° C., preferably 125°–135° C., before entering a naphthalene stripper-wash oil still.

9 Claims, 2 Drawing Figures

REMOVAL OF NAPHTHALENE FROM RECIRCULATED WASH OIL

FIELD OF THE INVENTION

This invention relates to a method for the final cooling of coke oven gas and, more particularly, to a method for removing naphthalene from the recirculated wash oil in the final cooling of coke oven gas.

BACKGROUND OF THE INVENTION

In the process of coking coal in the absence of air, large volumes of gas, commonly called coke oven gas, are produced in addition to carbonaceous residue. This coke oven gas contains valuable by-products, such as ammonia, naphthalene, tar and light oils comprising benzene, toluene, xylenes and other hydrocarbons which are typically recovered in by-product recovery systems associated with the coke oven plants.

In the by-product recovery processes currently in use, the hot coke oven gas leaves the coking furnaces at a temperature of 600°–700° C. and is shock cooled by a spray of aqueous flushing liquor in a collecting main. This cooling effects a condensation of some of the vapors and removes heavy tar from the coke oven gas. The non-condensed gases at about 75°–80° C. are directed to a primary cooler where further cooling to about 35°–50° C. by spraying with water or "ammonia liquor" removes additional tar. Part of the ammonia present in the gas is absorbed in the aqueous liquid in the primary cooler and, together with the tars and a large portion of the naphthalene that are condensed, is carried away with the "ammonia liquor". Any tar remaining in the gas is usually removed in a subsequent electrostatic precipitator.

After passing through the primary coolers and electrostatic precipitators, the cooled coke oven gas is contacted with sulfuric acid in an ammonia absorber to remove any remaining ammonia preparatory to treatment of the gas for the recovery of light oils and subsequent scrubbing to eliminate hydrogen sulfide. Although the gas from the ammonia absorber has had most of its naphthalene content removed with the tars during the primary cooling of the gas, a significant amount of naphthalene vapor remains in the coke oven gas at this point. Further cooling of the gas is achieved in a final cooler to lower the temperature of the gas stream for efficient processing in a light oil by-product recovery stage.

The final cooling is usually accomplished by the direct contact of the gas with a cooling liquid. The gas may be passed through a spray of the cooling liquid or it may be bubbled through the liquid. The cooling liquid may be water or it may be a solvent for naphthalenic materials such as washing oils or benzol oils from the light oil recovery plant.

Water cooling of the coke oven gas in the final coolers from about 45°–60° C. to about 20°–30° C. results in the naphthalene vapors precipitating as crystallized solids. In addition, a quantity of water vapor also condenses from the coke oven gas, which condensate is contaminated with dissolved ammonia, cyanides, sulfides and phenols in dilute concentrations.

Where a solvent for naphthalene is used to cool the gas, the precipitated naphthalenic solids are immediately dissolved in the cooling liquid. In a solvent cooling process, the liquid effluent from the final cooler must be separated by use of a decanter into a condensed water stream and a naphthalene enriched solvent stream from which the dissolved naphthalene must be removed as it accumulates to permit cooling and recycling of the cooling liquid.

It is known in the art to "bleed off" a portion of the solvent stream emanating the decanter and to remove the dissolved naphthalene from this bleed stream of solvent in a naphthalene stripper or in a combination naphthalene stripper-wash oil still. However, during the operation of a recirculating wash oil final cooling system for coke oven gas having a wash oil-bleed stream scheme, several problems developed which adversely affected the efficiency and performance of the process equipment.

The wash solvent stream emerging from the decanters, which are designed to separate the condensed water from the wash solvent, nevertheless contained relatively high water concentrations of above 0.5% (wt.). It was discovered that the high water concentrations in the wash solvent stream resulted from the poor separation of the water phase and wash solvent phase in the decanters because a stable emulsion ("muck") of naphthalene enriched wash solvent, water and solids had formed. This "muck" is actually a mixture of solids and two liquids which are immiscible in each other and are of different specific gravities.

The decanter is designed for the lighter wash solvent to overflow and for the heavier water to discharge from the bottom. While most of the "muck" distributes itself between the wash solvent and water phases, a not insubstantial amount does manage to overflow with the wash solvent into the recycle loop and eventually into the bleed stream to the stripper.

Therefore, the naphthalene stripper-wash oil still did not receive a "dry" bleedstream of wash solvent which was less than 0.5% (wt.) water and was substantially free of solids, but instead was fed a wash solvent having a 1.0–4.5% (wt.) water and a 5–300 ppm solids content.

Unfortunately, the "muck" also continually accumulates to the extent that it could eventually fill the decanter. One solution is to continually discharge the "muck" to waste; however, this results in a constant loss of wash solvent.

The presence of this high concentration of water and solids severely limited the ability of the stripping steam passed through the naphthalene stripper-wash oil still to remove naphthalene from the wash solvent. When injected into the top of the stripper at the designed operating temperature of about 115° C., the water-containing wash solvent lowered the stripping temperature to about 101° C. because the steam was being used to volatilize the water instead of stripping the naphthalene. Consequently, the naphthalene content of the wash solvent leaving the naphthalene stripper increased to an average of about 5% (wt.), much higher than the required 1.7% necessary for proper naphthalene absorption in the final cooler. The entire coke oven gas final cooling-naphthalene removal process had been designed to afford a stripped wash solvent having about 1.7% (wt.) naphthalene from the stripper-still unit for use as make-up wash solvent that would assure the required removal of naphthalene from the coke oven gas in the final cooler. If naphthalene is not removed sufficiently to yield a stripped wash solvent meeting the design criterion, the naphthalene concentration in the recycling wash solvent will increase to a level which is in equilibrium with the naphthalene concentration in the coke oven gas. Consequently the amount of naphthalene removed from the coke oven gas in the final cooler will be reduced causing naphthalene-fouling problems downstream in the coke oven gas by-products process equipment such as the light oil scrubber, the gas mains and the equipment for underfiring the coke oven batteries.

The water-containing wash solvent prior to its injection into the stripper was heated to a temperature above 125° C. in an attempt to facilitate the evaporation of the water and permit the stripping steam to strip the naphthalene from the wash oil to the degree for which the system was engineered. This did not solve the problem. Moreover, in addition to the naphthalene content of the stripper wash solvent remaining at about 5% (wt.) and the stripping temperature remaining at about 101° C., there developed severe frothing on the top trays of the stripper and carry-over into the vapor-to-oil heat exchanger which follows the stripper. In order to remove naphthalene from the wash solvent to the level for which the stripper-still was designed, an increased amount of stripping steam would be required under such conditions. It would also necessitate extensive modifications to the stripping still and additional operating costs. Furthermore, the high concentration of naphthalene and the presence of solids in the wash solvent upon recycling to the final coolers contribute to the formation of the stable "muck" emulsion layer in the wash solvent decanters. In sum, the stripper-still unit and the decanters were not performing as expected.

There is a need to continually provide the naphthalene stripper with a clean, dry wash solvent bleed stream which contains less than 0.5% (wt.) water.

There is a need to maintain a low concentration of naphthalene in the stripper wash solvent stream for recycling as make-up wash solvent.

Further there is a need to minimize the amount of wash solvent that must be removed, or "blown-down", from the final cooling-naphthalene removal system and to reduce the subsequent addition of fresh wash solvent that must be added to the system.

There is also a need to control the formation of a water and wash solvent emulsion in the decanters of a recirculating wash solvent final cooling system.

There is a further need to improve the performance of the naphthalene removal equipment without increasing the usage of stripping steam or making extensive modifications to existing facilities.

There is a still further need to prevent uncontrolled frothing on the top trays of the naphthalene stripper.

There is also a need to provide uninterrupted liquid-liquid-solid separation capabilities that can remove the "muck" from the wash solvent bleed stream in order to maintain the final cooling-naphthalene removal system as a continuous process rather than a bulk process.

SUMMARY OF THE INVENTION

The above problems can be solved and the above needs can be satisified using the present invention in a non-aqueous final cooling system for coke oven gas. A water immiscible wash solvent used as the cooling medium in a final cooling tower emerges from the cooling tower as a naphthalene enriched wash solvent effluent containing condensed water and solid materials. This effluent is split into a water flow and a wash solvent flow which is cooled and recirculated to the final cooler. A portion of the recirculating wash solvent flow is removed as a bleed stream. This bleed stream is separated, continually and simultaneously, into a water stream, a sludge stream and a clean, dry wash solvent stream which is substantially free of solids and has a water content less than 0.5% (wt.), preferably less than 0.1% (wt.). The dry wash solvent stream is then heated to a temperature of less than about 160° C., preferably about 125°-135° C., before passing it into a stripping column where the naphthalene is stripped from the wash solvent to yield stripped wash solvent for recycling to the final cooler. Prior to separating the wash solvent stream into the three effluent streams it is preferred to heat the wash solvent stream in order to lower its viscosity and facilitate the separation step. Advantageously, the wash solvent stream is preheated up to, but not higher than, about 80° C. to avoid vaporizing any benzene which may be present. In addition, it is also preferred to maintain the top of the stripping column at about 120° C. to optimize removal of the naphthalene.

DETAILED DESCRIPTION OF THE INVENTION

The following description of the preferred embodiment of the invention utilizes wash oil as the cooling liquid for the coke oven gas. It is contemplated that any solvent for naphthalene having minimal vapor pressure at the operating temperature is within the scope of the invention.

Figure 1:
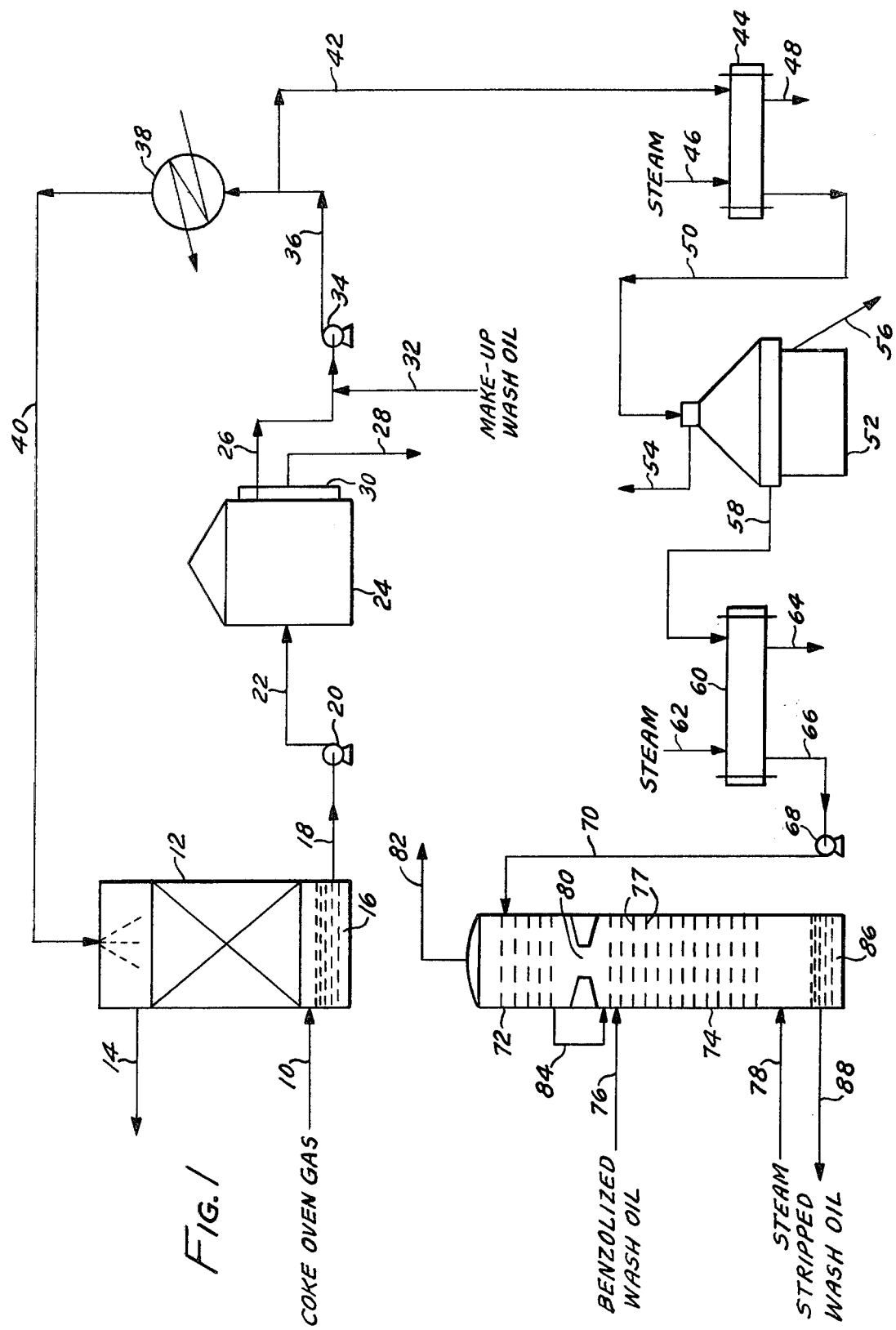
FIG. 1 is a schematic diagram of the preferred embodiment for practicing the invention.

Referring to FIG. 1, coke oven gas 10 at about 45°-60° C., which has previously passed through the primary coolers, electrostatic precipitators and ammonia absorbers, not shown, enters a final cooler 12 in which the gas is contact cooled by recirculating wash oil and exits as a cooled gas stream 14 at about 27° C. The final cooler 12 may by any cooling tower familiar to those skilled in the art which affords intimate contact of the gas stream with the cooling wash solvent. For example, final cooler 12 depicted in FIG. 1 sprays the cooling liquid across the gas flow path and then the liquid percolates downward over a packing for efficient gas-liquid contact. The recirculating wash oil, in addition to removing heat from the coke oven gas, absorbs naphthalene, condenses water and captures other solids and contaminants. The wash oil containing dissolved gases and liquids and other components collects in the bottom 16 of the final cooler. Exiting the final cooler in line 18 the used, contaminated wash oil at about 35° C. is conveyed via pump 20 and line 22 into a wash oil decanter 24. An apparatus which is well known in the art, the decanter 24 splits the contaminated wash solvent utilizing a fixed position water overflow device 30 into a wash oil flow 26 and a condensate water flow 28 which is discharged. The decanter may also be an integral part of the base of the final cooler. Make-up wash oil 32 is added to wash oil flow 26 which passes via pump 34 and line 36 through an indirect heat exchanger 38 where the wash oil is cooled before returning to the final cooler 12 by line 40.

A portion of the wash oil flow in line 36 is removed by line 42 as a wash oil bleed stream which flows through an indirect heat exchanger 44 where the wash oil bleed stream is preheated to a temperature of up to 80° C. Steam 46 enters the heat exchanger 44 and leaves as condensate 48. The heated wash oil at this point contains suspended solids and some residual water which overflowed the decanter 24 in the form of a "muck". The solids concentration can range from 5 to 300 ppm and the concentration of water can range from 1.0 to 4.5% (wt.) and even as high as 10% (wt.) in certain instances.

The heated and contaminated wash oil bleed stream from preheater 44 is fed via line 50 into a high-speed continuous centrifugal separator 52 which is described in more detail hereinafter. Centrifugal separator 52 continually and simultaneously splits the contaminated wash oil bleed stream into three streams: a water stream 54; a sludge stream 56 containing the solids, some water and minor amounts of solvent; and a clean, dry wash oil stream 58 containing dissolved naphthalene. The clean, dry wash solvent contains only trace amounts of solids and the water content is reduced to a final concentration much less than 0.5% (wt.).

From the centrifugal separator the clean, dry wash solvent stream 58 next enters an indirect heat exchanger 60 where it is heated to less than 160° C., and preferably 125°–135° C., by steam 62 which exits a condensate 64. The heated wash solvent in line 66 is sent by pump 68 through line 70 to a naphthalene stripper 72, which is located on top of and communicates with a benzolized wash oil still 74, where naphthalene is removed by steam stripping. This combination naphthalene stripper-benzolized wash oil still is an apparatus quite familiar to workers in the coke oven gas by-products recovery field. The stripper-still can be viewed as a multi-plate bubble-cap fractionating column for steam distillation, which column is divided into two sections. Although a stripper-still device is shown and described, the invention is also applicable to a naphthalene removal scheme using an individual naphthalene stripper column.

Benzolized wash oil 76 from a light oil recovery process and heated to about 125° C. enters the upper part of the wash oil still 74 at an entrance point in the still which leaves at least one tray 77 above the feed to keep entrainment of the wash oil to a minimum. Benzolized wash oil contains 2 to 3% light oil which comprises benzene, toluene, xylenes and other hydrocarbons.

Steam 78 entering near the base 86 of the wash oil still flows upwardly through the column countercurrently contacting the downwardly flowing benzolized wash oil. The steam strips the light oil from the wash oil. The mixture of steam and light oil vapors ascend from the top of still 74 through neck 80 into the bottom of stripper 72 where the steam and vapors countercurrently contact downwardly flowing naphthalene enriched wash oil and thereby strip the naphthalene from the wash oil. The combined water, light oil and naphthalene vapors emerge from the stripper 72 by line 82 to be conducted to a vapor-to-oil heat exchanger (not shown) which recovers heat and acts as a partial condenser.

Since the neck 80 is designed to permit only the passage of upwardly flowing gases, the naphthalene stripped wash oil collects in the base of the stripper 72 from which it is conveyed to the top of the wash oil still 74 by conduit 84. Light oil that may have been absorbed by the naphthalene stripped wash oil is removed in the still. The combined stripped wash oil streams collect in the base 86 of the still and exit via line 88 for reuse in the plant processes such as make-up wash oil for the final cooling step.

In order to maintain the process of this invention as a continuous flow process the separator 52 must be capable of continually and simultaneously splitting the wash oil bleed stream into three streams, namely a water stream, a sludge stream containing substantially all of the solids in the bleed stream and a clean, dry wash oil stream. This three-way splitting is necessitated by the constitution of the "muck" which contains two immiscible liquids and solids and its presence in the bleed stream.

Two-way splitting either separates the solids from the two immiscible liquids and requires another liquid-liquid separation step, or separates the two liquid phases with the "muck" being distributed as such between the two phases and still requiring removal. The decanters are an example of the latter two-way splitting. In both instances, two-way splitting requires at least two steps. Three-way splitting affords a continuous, single step.

The "muck" is believed to be formed in the following manner. The naphthalene enriched wash oil effluent which leaves the final cooler contains condensed water and solids. These solids are believed to be condensed tar bodies which have a specific gravity less than one but greater than that of the wash oil. The final cooler effluent undergoes violent mixing during its passage from the final cooler into the decanter where it settles into three distinct layers. The top layer comprises the wash oil containing dissolved naphthalene, the bottom layer comprises the aqueous condensate and aqueous-soluble contaminants and the intermediate layer comprises the wash-water oil emulsion and entrained solids. The solids seem to enhance the formation and stabilization of the water-wash oil emulsion.

Figure 2:
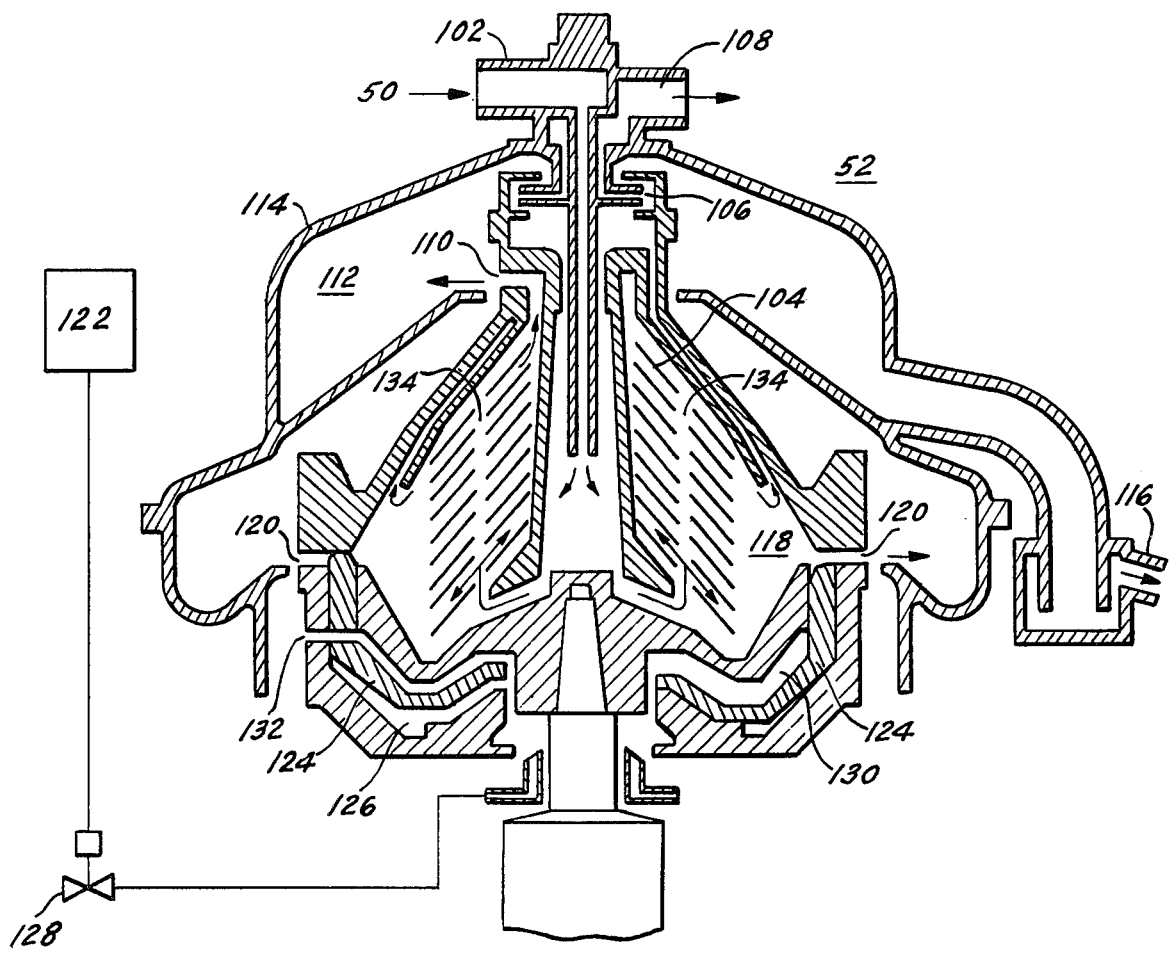
FIG. 2 is a drawing of a centrifugal separator used in the practice of this invention.

In the practice of the invention, the required step of continually and simultaneously splitting the bleed stream into three phases can be performed with a high speed continuous centrifugal separator manufactured by Westfalia Separator AG, Oelde, West Germany and distributed by Centrico, Inc., Northvale, New Jersey as the model SA 45 De-Sludger/Separator. FIG. 2 is a drawing of such a centrifugal separator designed to separate immiscible liquid mixtures of different specific gravities while simultaneously removing solids contained in the liquid mixture.

Referring to FIG. 2, the wash oil bleed stream 50 enters the centrifugal separator 52 through inlet 102 and is separated in disc set 104. The heavy aqueous phase is discharged under pressure by centripetal pump 106 through outlet 108. The light wash oil phase leaves through outlet 110 and passes into the catch chamber 112 of hood 114 from where it flows out by gravity through siphon 116. The separated solids accumulate in sediment holding space 118. Intermittent sediment ejection through ports 120 is controlled by timing unit 122. Depending on the character and volume of solids, timing unit 122 can be adjusted to perform partial or total sediment ejections, combined partial and total sediment ejections and flushing of the separator after each total sediment ejection. Piston 124 is in closed position (left side of diagram of FIG. 2) when closing-water chamber 126 is filled. Ejection ports 120 open when operating water is fed by valve 128 into opening-water chamber 130. The resultant pressure in chamber 130 forces the piston 124 down (right side of diagram) and the solids are ejected through ports 120. When operating-water valve 128 is closed, the water bleeds out of the opening-water chamber 130 through drain hole 132 and the piston rises, closing the ejection ports 120.

Physical separation of the two liquid components occurs within the disc set 104. The light wash oil phase builds up in the inner section and the heavy aqueous phase builds up in the outer section. The dividing line between the two is called the "separating zone" and should be located along the line of the rising channels 134 for most efficient separation. The rising channels 134 are a series of holes in each disc arranged so the holes provide vertical channels through the entire disc set. These channels also provide the entrance for the liquid mixture into the spaces between the discs. As centrifugal force separates the two liquids, the solids move outward to the sediment-holding space 118. The location of a separator zone may be controlled by adjusting the back pressure of a discharged liquid phase.

More information concerning such continuous centrifugal separators can be had from U.S. Pat. Nos. 3,448,919, 3,938,734, 3,990,632 and 4,026,462 which are assigned to Westfalia Separator AG.

Without the high-speed centrifugal separator, the naphthalene content of the wash oil leaving the naphthalene stripper-wash oil still column ranged from 2.0–8.5% (wt.), averaging about 5% (wt.). Incorporation of the high speed centrifugal separator into the wash oil bleed stream line resulted in the reduction of the naphthalene content of the steam-stripped wash oil to a 1.0–2.5% (wt.) range with an average of about 1.8% (wt.). Neither frothing nor carryover into the vapor-to-oil heat exchanger following the stripper was evident even though the wash oil bleed stream was heated to above 125° C. Importantly, the temperature at the top of the stripper did not fall, but rather was maintained at about 120° C. This improvement of naphthalene removal was accomplished without making any modification either to the stripper 72 or the wash oil still 74 and without increasing the amount of stripping steam 78.

During a 25-day period a coke oven gas final cooling-naphthalene removal system as depicted in FIG. 1 was in continual operation. A 30 gpm centrifugal separator was incorporated into the wash oil bleed stream line to a naphthalene stripper-wash oil still column. The following operating parameters represent approximate average values obtained from the data developed during several test runs.

Coke oven gas at 40,000 SCFM and 55° C. was counter-currently contact cooled in a final cooling tower with recirculated wash oil flowing at 2400 gpm. The coke oven gas emerged from the final cooler at about 26° C. A wash oil bleed stream of 30 gpm was taken from the recycling loop and preheated up to about 80° C. The temperature of the clean, dry wash oil stream fed into the stripper-still was maintained at 125°–135° C. (avg. 126° C.) After preheating to about 124° C. the benzolized wash oil from the light oil recovery plant was conducted into the still section at a flow rate of 510 gpm where it was stripped by steam flowing into the wash oil still at 340 lb/min, or about 0.7 lb of steam per gallon of benzolized wash oil feed. The compositions of the wash oil bleed stream to the centrifugal separator, the dry wash oil stream and the water stream from the separator, and the debenzolized wash oil from the stripper-still are given in the following table.

|  | Wash Oil Bleed Stream | Dry Wash Oil Stream | Water Stream | Debenzolized Wash Oil |
| --- | --- | --- | --- | --- |
| Water (%) |  |  |  |  |
| Range | 1.20–4.31 | trace–<0.1 | — | 0.002–<0.1 |
| Average | 2.33 | <0.009 |  | 0.015 |
| Solids (ppm) |  |  |  |  |
| Range | 5–268 | trace | 0.9–16.0* | 15–466 |
| Average | 55 | trace | 18–97**<br>4.6*<br>45** | 215 |
| Benzene (%) |  |  |  |  |
| Range | 1.66–2.74 | — | — | 0.007–0.03 |
| Average | 2.11 |  |  | 0.01 |
| Toluene (%) |  |  |  |  |
| Range | 0.37–0.63 | — | — | 0.008–0.02 |
| Average | 0.46 |  |  | 0.01 |
| Xylenes (%) |  |  |  |  |
| Range | 0.38–0.60 | — | — | 0.03–0.03 |
| Average | 0.49 |  |  | 0.03 |
| Naphthalene (%) |  |  |  |  |
| Range | 4.73–6.81 | — | — | 1.09–2.63 |
| Average | 5.83 |  |  | 1.86 |

*chloroform washed
**hexane washed

While particular embodiments of the present invention have been shown and described, it is apparent that various changes and modifications may be made, and it is therefore intended in the following claims to cover all such modifications and changes as may fall within the true spirit and scope of this invention.

We claim:

1. In a method for the final cooling of coke oven gas using a recirculating water immiscible wash solvent in which the coke oven gas is cooled by contact with the wash solvent in a final cooling tower, a naphthalene enriched wash solvent containing condensed water and solid material emerges from the cooling tower as an effluent and the effluent is split into a recirculated naphthalene enriched wash solvent flow which contains water and solids, and a water flow, the improvement comprising:
   (a) removing a bleed stream of wash solvent from the naphthalene enriched wash solvent flow,
   (b) continually and simultaneously centrifugally separating the wash solvent bleed stream of step (a) into a waste water stream, a sludge stream and a clean, dry wash solvent stream which is substantially free of solids and has a water content less than 0.5% (wt.),
   (c) heating the clean, dry wash solvent stream to a temperature of less than about 160° C., and
   (d) stripping the naphthalene from the clean, dry wash solvent stream with steam to yield a stripped wash solvent.

2. The method of claim 1 including the step of
   (e) conveying the stripped wash solvent as make-up wash solvent to the recirculating wash solvent to the final cooler.

3. The method of claim 1 in which the clean, dry wash solvent stream is heated to a temperature of about 125°–135° C.

4. The method of claim 1 or 3 in which the wash solvent bleed stream is preheated prior to its being separated in step (b).

5. The method of claim 4 in which the clean, dry wash solvent stream of step (b) has a water content of less than 0.1% (wt.).

6. The method of claim 2 in which the clean, dry wash solvent stream of step (b) has a water content of less than 0.01% (wt.).

7. The method of claim 1 or 3 in which the wash solvent bleed stream is preheated up to about 80° C. prior to its being separated in step (b).

8. The method of claim 1 or 3 in which the clean, dry wash solvent stream of step (b) has a water content of less than 0.1% (wt.).

9. The method of claim 1 or 3 in which the clean, dry wash solvent stream of step (b) has a water content of less than 0.01% (wt.).

* * * * *